United States Patent [19]

Hutton et al.

[11] Patent Number: 4,507,454
[45] Date of Patent: Mar. 26, 1985

[54] ACRYLIC POLYMERS SOLUTIONS FOR USE IN FORMING A MEMBRANE FOR CURING CONCRETE AND THE LIKE

[75] Inventors: Thomas W. Hutton, Doylestown; Joseph A. Lavelle, Bethlehem, both of Pa.

[73] Assignee: Rohm and Haas Company, Philadelphia, Pa.

[21] Appl. No.: 137,211

[22] Filed: Apr. 4, 1980

Related U.S. Application Data

[62] Division of Ser. No. 795,601, May 10, 1977, Pat. No. 4,225,651.

[51] Int. Cl.$^3$ .................. C08F 212/08; C08F 220/16; C08F 220/64

[52] U.S. Cl. .................... 526/317; 428/522; 526/240; 526/287; 526/311; 526/312

[58] Field of Search .............. 260/31.2 R, 32.8 R, 260/33.4 R, 33.6 UA; 526/287, 317, 240, 311, 312

[56] References Cited

U.S. PATENT DOCUMENTS

| | | | |
|---|---|---|---|
| 2,971,935 | 2/1961 | Floria | 526/287 |
| 3,725,122 | 4/1973 | Reinhard et al. | 526/287 |
| 3,879,357 | 4/1975 | Wingler et al. | 526/317 |
| 4,021,504 | 5/1977 | Conrad et al. | 526/317 |
| 4,137,389 | 1/1979 | Wingler et al. | 526/317 |
| 4,177,178 | 12/1979 | Das et al. | 526/317 |

*Primary Examiner*—Harry Wong, Jr.
*Attorney, Agent, or Firm*—Michael B. Fein

[57] ABSTRACT

An addition polymer is disclosed, the utility being to apply the same as a film to a hydraulic cement-containing article prior to curing, such as concrete, asbestos-cement shingles and the like, for example, to prevent moisture loss during the early hardening period. The polymers are formed of about 10 to 50 percent by weight of an ester of acrylic or methacrylic acid, the alcohol moiety of which has from 12 to about 20 carbon atoms, about 40 to 89.5 percent by weight of a vinyl aromatic monomer, and about 0.5 to 5 percent of a copolymerizable ethylenically unsaturated carboxylic acid, vinyl sulfonic acid, or salts thereof, preferably 15 to 30 percent of the ester, 69 to 84 percent of the vinyl aromatic material, and 1 to 3 percent of the unsaturated acid. In addition to use on concrete, the materials are useful for application to asbestos-cement shingles, prior to curing, and other similar uses. The preferred vinyl aromatic compound is styrene or vinyl toluene, and the preferred acid is itaconic acid, acrylic acid, or methacrylic acid.

5 Claims, No Drawings

ACRYLIC POLYMERS SOLUTIONS FOR USE IN FORMING A MEMBRANE FOR CURING CONCRETE AND THE LIKE

This is a division of application Ser. No. 795,601, filed May 10, 1977, now U.S. Pat. No. 4,225,651.

This invention relates to the application of a film of polymeric material to a hydraulic cement-containing material in the undried state, in order to prevent premature moisture loss in the early hardening period.

It is known that the curing process for concrete and the like made with hydraulic cements such as Portland cement may extend over a long period of time, even years in duration. The curing involves a reaction of water with the components of the cement and the like, and obviously evaporation of water during the early stages of curing of the concrete can result in concrete which is improperly cured. As a consequence the material suffers a loss in strength.

A number of materials have been proposed for this use including aqueous dispersions of emulsion polymerssuch as polyvinyl acetate, acrylics or the like, as shown for example by U.S. Pat. No. 3,386,854, or by organic solvent solutions of polymers such as "Pliolite" AC-L produced by Goodyear Chemical. This product is believed to be a polymer of 2-ethylhexylacrylate/styrene/unsaturated acid in the weight ratios of approximately 22/79/1, and which is applied for example as a xylene solution. Other products have been proposed or tested as shown by the comparative examples herein.

The method involves the improvement of applying a film of the polymer, particularly as an organic solvent solution, to concrete or the like and drying the film and curing the cementitious material. The composition of the invention contains about 10 to about 50 percent of an ester of acrylic or methacrylic acid, the alcohol moiety of which has from 12 to about 20 carbon atoms, of which has from 12 to about 20 carbon atoms, about 40 to 89.5 percent by weight of a vinyl aromatic monomer, and about 0.5 to 5 percent of a copolymerizable ethylenically unsaturated carboxylic acid, vinyl sulfonic acid, or a salt thereof. Preferably the polymer is prepared from 15 to 30 percent of the ester, 69 to 84 percent of the vinyl aromatic material and 1 to 3 percent of the unsaturated acid.

The specified monomers are essential to success. The ASTM specifications for "Liquid Membrane-Forming Compounds for Curing Concrete", designation C 309-74 and "Standard Method of Test for Water Retention by Concrete Curing Materials", designation C 156-74 set forth the methods used herein for determining the efficacy of the subject polymers for the designated use. These specifications, in regard to water retention, state that the membrane forming compound shall restrict the loss of water to not more than 0.055 g/cm$^2$ of surface in 72 hours. To illustrate the criticality of the monomer selection, the comparative examples hereinbelow show that when ethyl acrylate or butyl acrylate is substituted for the higher alcohol esters of the invention, the moisture vapor transmission rate increases substantially. Similarly, when methyl methacrylate is substituted for the vinyl aromatic compound such as styrene the moisture vapor transmission rate also increases substantially. While 2-ethylhexyl acrylate, when substituted for the higher alcohol esters of the invention, gives good results, the acrylate esters are more prone to hydrolysis under alkaline conditions than are the methacrylates. Thus the preferred materials of the invention, the methacrylates, are superior in this regard for use with highly alkaline materials such as wet cast concrete.

Interestingly enough, there seems to be little or no correlation between the rate of moisture transmission of a preformed free film of a polymer as compared with the utilization of the same polymer in accordance with the ASTM methods mentioned heretofore. A polymer in the form of a free film may be excellent in resisting the transmission of water vapor, whereas when applied in accordance with the concrete membrane procedure, it performs poorly. For example, a polymer of styrene/butyl acrylate/methacrylic acid in the weight ratios of approximately 79/20.5/0.5, applied at a 50% solids concentration in xylene, performs well as a free dry film as regards resisting the transmission to water vapor, but when applied in the environment of a curing membrane for concrete at 18 percent solid, does not perform at all well. "Mylar" of about 1 mil in thickness gives a vapor transmission by the procedure of ASTM E-96 of 1.8 g/mil/100 in$^2$ over a period of 24 hours (100 in$^2$ is equal to 645.2 cm$^2$). A similar film of "Pliolite" AC-L gives a figure of 1.1 grams on the same basis and a dry film of the styrene/butyl acrylate/methacrylic acid 79/20.5/0.5 composition mentioned above gives the same rate of transmition, 1.1 grams of moisture on the same basis.

The polymers of the invention are prepared by conventional solution polymerization using free radical initiators, although other polymerization procedures can be used including anionic initiation, as well as emulsion polymerization, bulk polymerization or suspension polymerization. With the use of aqueous systems, the products are preferably dried and utilized in organic solvents. Known methods of controlling molecular weight are used.

As vinyl aromatics, typical compounds are styrene and vinyltoluene. As to the unsaturated acids, methacrylic acid and acrylic acid are perferred although polycarboxylic acids may be utilized as may other unsaturated acids including itaconic acid, aconitic acid, vinylsulfonic acid and the like as well as their alkali metal, ammonia, or volatile amine salts. The higher alcohols are suitably mixtures of alcohols derived from the hydrogenation of fats or oils. For example, the material designated as dodecyl-pentadecyl methacrylate is a mixture of esters having been derived from the series of alcohols ranging from dodecyl to pentadecyl. Similar mixtures are dodecyl-octadecyl and hexadecyl-eicosyl alcohols. Of course, a pure single alcohol may be utilized in preparing the ester, examples being octadecyl alcohol to form octadecyl methacrylate and isodecyl alcohol to make isodecyl methacrylate. Dodecyl methacrylate is another example. The alcohols need not be straight chain nor need they be aliphatic. Thus, they may be cycloaliphatic or aromatic in nature. Among the suitable acrylic and methacrylic esters of higher alcohols in addition to those mentioned heretofore, may be mentioned isodecyl acrylate, n-decyl acrylate, isodecyl methacrylate, n-decyl methacrylate, hexadecyl acrylate, hexadecyl methacrylate, n-dodecyl acrylate, n-dodecyl methacrylate, octadecyl acrylate, octadecyl methacrylate and the like, the methacrylates being preferred.

While the compositions normally consist of the specified monomers, small amounts of other ethylenically unsatuurated addition polymerization materials, up to about 10 percent of the total weight of the monomers, may be utilized and still fall within the invention.

Suitable volatile organic solvents include aromatic hydrocarbons, aliphatic hydrocarbons, esters, glycols, ketones, and other known to the art, including toluene, ethylene glycol, amyl acetate, methyl ethyl ketone, etc. The molecular weights of the polymers range from 30,000 to 150,000 as $\overline{M}w$ and 10,000 to 50,000 as $\overline{M}n$.

The concrete, asbestos-cement shingles, and the like are made by conventional procedures, such as are described in U.S. Pat. Nos. 3,106,486 and 3,547,853. The former relates to asbestos-cement shingles coated with acrylic polymers, and the other patent relates to the inclusion of acrylic polymers in concrete mixtures.

The expression "hydraulic cement" is intended to include all such chemical combinations of lime, silica, and alumina, or of lime and magnesia, silica and alumina and iron oxide (magnesia for example may replace part of the lime, and iron oxide a part of the alumina), commonly known as hydraulic natural cements. Hydraulic natural cements include grappier cements, pozzolana cements, natural cements, Portland cements, white cements, and aluminous cements. Pozzolana cements include slag cements made from slaked lime and granulated blast furnace slag. Because of its superior strength, Portland cement is preferred among the hydraulic cements. In addition to the ordinary construction grades of Portland cement or other hydraulic cements, modified hydraulic cements and Portland cements designated as high-early-strength cement, heat-resistant cement, and slow-setting cement may be used in the present invention. Among the Portland cements, it is to be noted especially that any of the ASTM types I, II, III, IV, and V may be employed.

Frequently, it is advantageous to incorporate sand in the mixture. The nature of the sand will be dictated by the intended use of the product. It is possible to use sand of small particle size, such as one having a diameter of one millimeter or less. On the other hand, where the product is subject to exacting requirements, as in the case of a cement patch applied to an existing concrete floor, graded sands of medium particle size such as "Ottawa" sand and "Best" sand or a mixture of the two may be used to better advantage. Ottawa sand is a silica sand of the type referred to as "round". Best sand is of the type known as "sharp". In both cases, fines will have been removed. In general, however, the sieve size of the sand may vary over a fairly wide range.

In lieu of or in addition to sand, it is possible to use ground glass, emery powder, diatomaceous earth, ground slag, fine gravel, trap rock and similar aggregates.

It is often advantageous to incorporate in the mixture, with or without sand, a minor fraction of clay; if so, the clay may take the form of kaolin or china clay, porcelain clay, fire clay, pipe clay, bentonite, and in fact, almost any one of the known types of clay. Because the type of clay sometimes has an effect on the water demand of the cement, it is occasionally desirable to avoid the use of clays which markedly increase the water demand.

Various other substances may be added to the cementitious material, particularly in its more concentrated forms; for example, sodium silicate type GD, which helps promote dry and wet adhesion. However, materials such as carboxymethyl cellulose, methyl cellulose, ethyl cellulose, ammonium polyacrylate, etc., may be incorporated for thickening purposes or for the purpose of improving the work-ability, finish or both. Inorganic reinforcing materials such as iron filings, asbestos fibres, glass fibres, etc., may be included or excluded as desired. Numerous other materials may be introduced into the mixture for these and other similar purposes including antimycotics, antifoams, water-reducing agents, set-retarding agents and the like.

When making concrete structures or floor coverings which contain large amounts of crushed rock or other aggregate and substantial amounts of sand, extremely good wet strengths accompanied with good dry strength can be obtained, provided that the amount of the hydraulic cement is substantially greater than the amount of sand and preferably 1.5 to 2 or 3 times the amount of sand. Excellent results are obtained in concrete compositions comprising one part of sand, 1.5 to 2.5 parts of a hydraulic cement, and an amount of rock or aggregate in excess of the amount of said cement and preferably not in excess of 4 parts.

The following examples illustrate the invention.

EXAMPLE 1

This example illustrates the synthesis, particularly of the composition of Example 5, of the polymers of the invention, and is typical of the polymers prepared for comparative examples. 20 parts of a mixture of esters of methacrylic acid with alcohols ranging from dodecyl to pentadecyl is polymerized with 78 parts of styrene and 2 parts of methacrylic acid, in xylene, utilizing t-butylperbenzoate, at a temperature of between about 140° and 149° C. After completion of the polymerization, a chaser solution of the t-butylperbenzoate in xylene is added to polymerize residual monomers. The solution is then adjusted to a solids content of about 50% by the addition of xylene.

EXAMPLE 2-6

The polymer prepared in accordance with the above procedure is applied in Example 5 in accordance with ASTM designations C 309-74 and tested in accordance with ASTM designation C 156-74 (both of which are incorporated in their entirety herein by reference), as are the other examples herein. The products, except the commercial product of Example 6, were prepared in accordance with the procedure of Example 1. Examples 2-4 and 6 are comparative examples.

The molecular weights are as follows:

TABLE I

| Example | $\overline{M}w$ | $\overline{M}n$ |
|---|---|---|
| 2 | 79,500 | 37,000 |
| 3 | 70,000 | 20,600 |
| 4 | 77,000 | 29,700 |
| 5 | 90,500 | 26,900 |
| 6 | 72,000 | 37,000 |

TABLE II

| Example | Composition | Wt. Ratio | MVTR[1] gm/cm$^2$/72 hours |
|---|---|---|---|
| 2 | EA/S/MAA | 20/78/2 | .060 |
| 3 | BA/S/MAA | 20/78/2 | .048 |
| 4 | 2-EHA/S/MAA | 20/78/2 | .037 |
| 5 | DPMA/S/MAA | 20/78/2 | .038 |
| 6[2] | Acrylate/ | — | .053 |

TABLE II-continued

| Example | Composition | Wt. Ratio | MVTR[1] gm/cm²/72 hours |
|---|---|---|---|
| | styrene/acid | | |

[1]Moisture vapor transmission rate is measured by ASTM C 156-74; specification ASTM C 309 requires <0.55 gm/cm²/72 hours; these specifications are expressly incorporated herein by reference.
[2]"Pliolite" AC-L, which is believed to be an aluminum salt coagulated copolymer of 2-ethylhexyl acrylate/styrene/unsaturated acid in the weight ratios of about 22/79/1, and having a weight average molecular weight of approximately 72,000 with the number average molecular weight being approximately 37,000, as determined by gel permeation chromotography.

This polymers of Examples 2-6 are spray applied from an 18 percent total solids solution in xylene, closely following the ASTM C 156-74 test method.

EXAMPLES 7-10

TABLE III

| Example | Composition | Wt. Ratio | MVTR[1] g/cm²/72 hours |
|---|---|---|---|
| 7 | EA/MMA/MAA | 20/78/2 | .084 |
| 8 | BA/MMA/MAA | 20/78/2 | .063 |
| 9 | DPMA/S/MAA | 20/78/2 | .038 |
| 10 | DPMA/MMA/MAA | 20/78/2 | .067 |

[1]ASTM C 156-74

The molecular weights are:

TABLE IV

| Example | $\overline{M_w}$ | $\overline{M_n}$ |
|---|---|---|
| 7 | — | — |
| 8 | — | — |
| 9 | 90,500 | 26,900 |
| 10 | 62,000 | 26,000 |

Example 9 falls within the invention, whereas Examples 7, 8, and 10 are comparative examples.

These examples illustrate the beneficial effect of both the vinyl aromatic monomer and the higher ester of methacrylic acid. In Examples 9 and 10, the estimated glass transition temperatures of the polymers are approximately equivalent to one another. None of the polymers containing the specific amount of methyl methacrylate met the ASTM specification C 309 of a moisture vapor transmission rate of less than 0.055 g/cm²/72 hours.

EXAMPLES 11-16

The following Table V illustrates the benefits of using the higher esters as compared with the prior art material, in that much lower solids contents of Examples 13-16, using the composition of Example 5 of the present invention, give equal or better moisture barrier properties than does the commercial product sold by Goodyear. The coverage rate is 200 ft.²/gal., as specified in the ASTM test methods, in each of the examples herein.

TABLE V

| Example | Solids[1] | g/cm²/72 hours Moisture-Vapor Transmission Rate[2] |
|---|---|---|
| 11-"Pliolite" AC-L | 18.2 | .053 (borderline pass) |
| 12-"Pliolite" AC-L | 16.0 | .062 fail |
| 13 | 18.0 | .042 pass |
| 14 | 16.0 | .045 pass |
| 15 | 14.1 | .050 pass |

TABLE V-continued

| Example | Solids[1] | g/cm²/72 hours Moisture-Vapor Transmission Rate[2] |
|---|---|---|
| 16 | 12.0 | .054 borderline |

[1]Resin in xylene
[2]ASTM C 156-74 method of test; ASTM C 309-74 specification

EXAMPLES 17-22

These are synthesized similarly to the product of Example 1. Example 17 is essentially the same as Example 5. DPma is a mixture of esters derived from methacrylic acid and a mixture of alcohols ranging from 12 to 15 carbon atoms. ISMA is a mixture of methacrylates derived from higher alcohols having from 12 to 18 carbon atoms. CEMA is a mixture of methacrylate esters derived from higher alcohols having from 16 to 20 carbon atoms. At a solids content of between 18 to 18.2% the sprayability of the "Pliolite" AC-L is somewhat better than the other products.

TABLE VI

| Example | Composition | Alkyl Chain Length | MVTR[5] (g/cm²72 /hours) |
|---|---|---|---|
| 17 | IDMA[1]/S/MAA 20/78/2 | $C_{10}$ | 0.046 |
| 18 | DPMA[2]/S/MAA 20/78/2 | $C_{12}-C_{15}$ | 0.033 |
| 19 | LSMA[3]/S/MAA 20/78/2 | $C_{12}-C_{18}$ | 0.037 |
| 20 | CEMA[4]/S/MAA 20/78/2 | $C_{16}-C_{20}$ | 0.038 |
| 21 | "Pliolite" AC-L Styrene/Acrylate/Acid | $C_8$[6] | 0.045[7] |
| 22 | Blank (No Membrane) | — | 0.212 |

[1]IDMA — Isodecyl methacrylate
[2]DPMA — Dodecyl-pentadecyl methacrylate
[3]LSMA — Dodecyl-octadecyl methacrylate
[4]CEMA — Hexadecyl-eicosyl methacrylate
[5]As measured by ASTM C 156-74; Specification ASTM C 309 requires <0.055 g/cm²/72 hours
[6]Determined by analysis and believed to be correct
[7]Previous results in earlier examples generally slightly higher, e.g., 0.053 g/cm²/72 hours Typical molecular weights are:

| Example | $\overline{M_w}$ | $\overline{M_n}$ |
|---|---|---|
| 18 | 63,300 | 18,300 |
| 21 | 72,000 | 37,000 |

In addition to the foregoing abbreviations, the other abbreviations used herein have the following meanings:

| Abbreviation | Monomer |
|---|---|
| EA | Ethyl acrylate |
| S | Styrene |
| MAA | Methacrylic acid |
| BA | Butyl acrylate |
| 2-EHA | 2-Ethylhexyl acrylate |
| MMA | Methyl methacrylate |

The molecular weights were determined by gel permeation chromatography. Gel permeation chromatograms are run on equipment commercially marketed by Waters Assoc. of Marlboro, Mass. Styragel columns are available prepacked in a variety of porosities. A column set is normally composed of four or five four foot sections chosen to cover the molecular weight range to be measured. With column sets of this length sufficient resolution is obtained so that axial dispersion can be disregarded. The column set must be calibrated for the polymer type whose molecular weight is to be determined. Narrow molecular weight standards are available for polystyrene. Calibration curves for other polymers such as polymethyl methacrylate are constructed from the chromatograms of broad samples using either an approximate distribution technique[1] or a universal calibration curve technique[2]. To calculate the molecular weights of unknown samples a table is prepared of the value Wi, of the GPC curve above baseline at equal volume increments and the molecular weight Mi, read from the calibration curve at these volumes. The weight average molecular weight $\overline{M}w$, and the number average molecular weight $\overline{M}n$, can be calculated from these values with the equations $$\overline{M}w = \frac{\Sigma W_i M_i}{\Sigma W_i}$$

$$\overline{M}n = \frac{\Sigma W_i}{\Sigma W_i/M_i}$$

$$\Sigma W_i = 1$$

For the polymers predominantly of methyl methacrylate the standard used for determining molecular weight was polymethyl methacrylate. For the polymers having a high content of styrene the standard utilized was polystyrene. It is to be realized that the molecular weight numbers given are approximate and not precise, but are validly used for comparative purposes.

[1] Calibration of Gel-Permeation Column with Unfractionated Polymers, A. Wiess, E. Ginsberg, J. Poly. Sci., Pt. A-2, 8 (1970)
[2] A note on the Universal Calibration Curve for Gel Permeation Chromatography - A. Weiss, E. Ginsberg, Poly. Letters, 7, 379–381 (1969)

We claim:

1. A composition of matter, an addition polymer of about 10 to 50 percent by weight of an ester of acrylic or methacrylic acid, the alcohol moiety of which has from 12 to about 20 carbon atoms, about 40 to 89.5 percent by weight of a vinyl aromatic monomer, and about 0.5 to 5% percent by weight of a copolymerizable ethylenically unsaturated carboxylic acid or vinyl sulfonic acid, or salt thereof, said composition being in the form of an organic solvent solution of said addition polymer.

2. The composition of claim 1 in which the ester is present in an amount of about 15 to 30 percent by weight, the vinyl aromatic monomer is present in an amount of about 69 to 84 percent by weight, and the unsaturated acid is present in the amount of about 1 to 3 percent by weight.

3. The composition of claim 2 in which said alcohol moiety is aliphatic said vinyl aromatic compound is styrene or vinyl toluene, and said acid is acrylic acid, methacrylic acid, or itaconic acid.

4. The composition of claim 3 in which said ester is of acrylic acid, and the $\overline{M}w$ is from 30,000 to 150,000.

5. The composition of claim 3 in which said ester is of methacrylic acid, and the $\overline{M}w$ is from 30,000 to 150,000.

* * * * *